(12) United States Patent
Abhigyan et al.

(10) Patent No.: US 11,374,875 B1
(45) Date of Patent: Jun. 28, 2022

(54) EDGE CLOUD RESOURCE ALLOCATION USING HINTS FROM NETWORK PROVIDERS

(71) Applicant: AT&T Intellectual Property I, L.P., Atlanta, GA (US)

(72) Inventors: Abhigyan Sharma Abhigyan, Basking Ridge, NJ (US); Aleksandr Zelezniak, Morganville, NJ (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/231,721

(22) Filed: Apr. 15, 2021

(51) Int. Cl.
| | |
|---|---|
| *H04L 29/06* | (2006.01) |
| *H04L 29/12* | (2006.01) |
| *H04L 12/911* | (2013.01) |
| *H04L 47/70* | (2022.01) |
| *H04L 9/40* | (2022.01) |

(52) U.S. Cl.
CPC .......... *H04L 47/82* (2013.01); *H04L 63/0876* (2013.01)

(58) Field of Classification Search
CPC ..... H04L 47/82; H04L 63/0876; H04L 63/10; H04L 67/22; H04L 67/125; H04L 41/16; H04L 43/065; H04L 43/08; G06F 2201/86

USPC .......................................................... 709/224
See application file for complete search history.

(56) References Cited

U.S. PATENT DOCUMENTS

| | | | |
|---|---|---|---|
| 2011/0235802 A1* | 9/2011 | Kokkinen | H04W 12/069 380/247 |
| 2018/0115522 A1* | 4/2018 | Gleichauf | H04L 29/06 |
| 2019/0042319 A1* | 2/2019 | Sood | G06F 9/5072 |
| 2019/0138356 A1* | 5/2019 | Bernat | H04L 9/0894 |
| 2019/0268310 A1* | 8/2019 | Guberman | H04L 67/12 |
| 2019/0319863 A1* | 10/2019 | Gupta | H04L 41/142 |
| 2020/0293914 A1* | 9/2020 | Liu | G06K 9/6257 |
| 2021/0243263 A1* | 8/2021 | Fong | H04L 67/34 |

* cited by examiner

*Primary Examiner* — Ruolei Zong
(74) *Attorney, Agent, or Firm* — Guntin & Gust, PLC; Jay Anderson

(57) ABSTRACT

Aspects of the subject disclosure may include, for example, a network API service that receives network event data and provides performance hints to a resource manager that manages application containers at edge cloud locations. Network event data may be received from access networks, core networks, nodes within access networks or core networks, or the like. Performance hints may allow booting of application containers at edge cloud locations. Other embodiments are disclosed.

20 Claims, 15 Drawing Sheets

300

EDGE CLOUD RESOURCE ALLOCATION USING HINTS FROM NETWORK PROVIDERS

FIELD OF THE DISCLOSURE

The subject disclosure relates to allocating edge cloud resources.

BACKGROUND

An edge cloud platform may include of a number of small data centers deployed at hundreds of locations within a network. Resource allocation is challenging at edge cloud locations because of their small size and the variety of applications to be supported.

BRIEF DESCRIPTION OF THE DRAWINGS

Reference will now be made to the accompanying drawings, which are not necessarily drawn to scale, and wherein.

DETAILED DESCRIPTION

Figure 1:
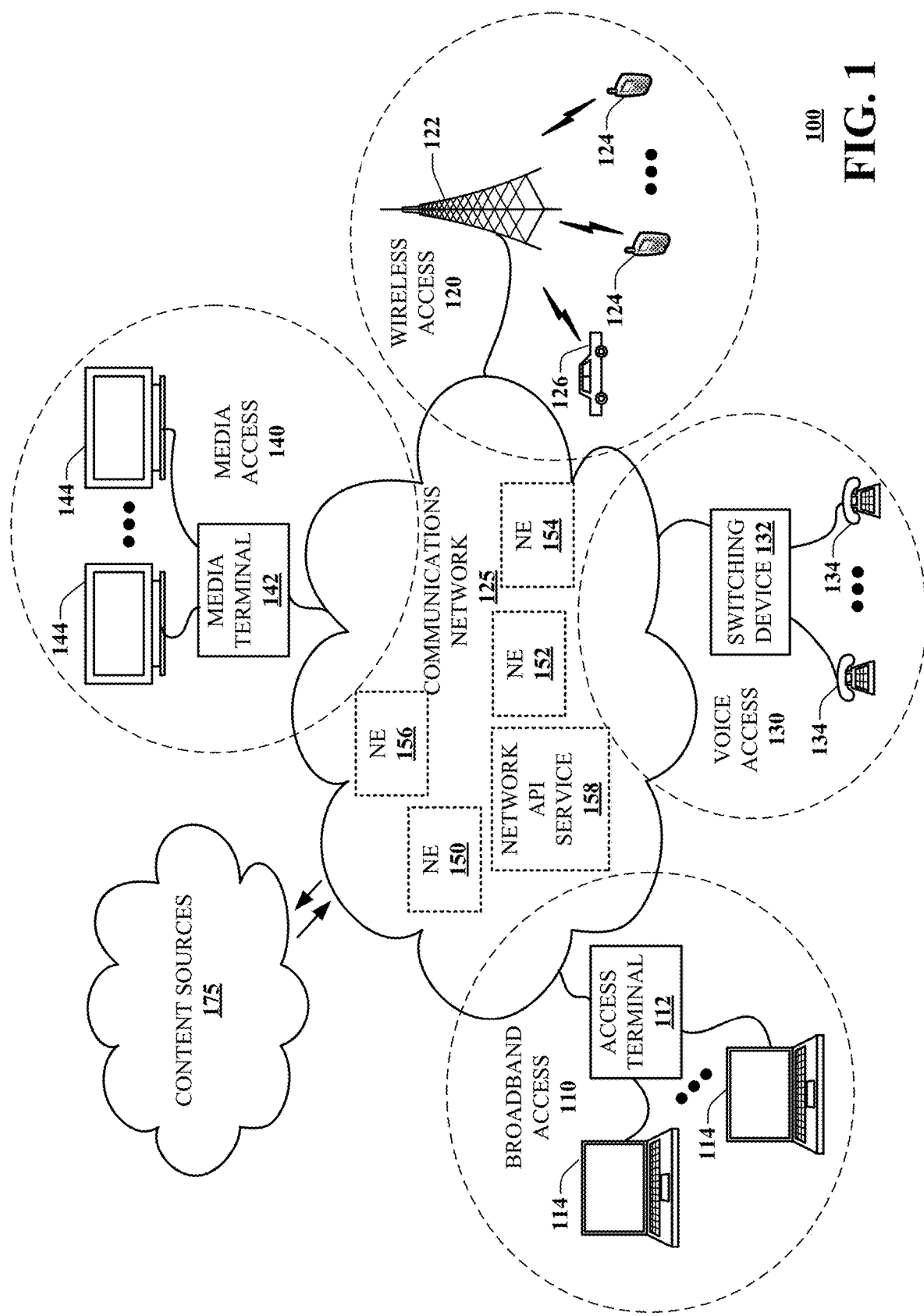
FIG. 1 is a block diagram illustrating an exemplary, non-limiting embodiment of a communications network in accordance with various aspects described herein.

The subject disclosure describes, among other things, illustrative embodiments for managing edge cloud resources in response to network events. Other embodiments are described in the subject disclosure.

One or more aspects of the subject disclosure include a device having a processing system including a processor and a memory that stores executable instructions that, when executed by the processing system, facilitate performance of operations. The operations may include receiving a request for edge cloud related network hints from an edge cloud resource manager, wherein the edge cloud related network hints are specific to a user equipment (UE) device, receiving network event data related to the UE device, creating the edge cloud related network hints from the network event data, and providing the edge cloud related network hints to the edge cloud resource manager.

Additional aspects include providing an authentication nonce to the UE device, wherein the request for the edge cloud related network hints incudes the authentication nonce; providing the edge cloud related network hints to an edge application master node; providing the edge cloud related network hints to an edge cloud platform; receiving network event data generated when the UE device attaches to, or detaches from, a network; and providing hints to boot or migrate an application container.

One or more aspects of the subject disclosure include a non-transitory machine-readable medium, comprising executable instructions that, when executed by a processing system including a processor, facilitate performance of operations. The operations may include receiving a request for edge cloud related network hints from an edge cloud resource manager, wherein the edge cloud related network hints are specific to a user equipment (UE) device, receiving network event data related to the UE device, creating the edge cloud related network hints from the network event data, and providing the edge cloud related network hints to the edge cloud resource manager.

One or more aspects of the subject disclosure include a method comprising receiving, by a processing system including a processor, a request for edge cloud related network hints from an edge cloud resource manager, wherein the edge cloud related network hints are specific to a user equipment (UE) device receiving, by the processing system, network event data related to the UE device, creating, by the processing system, the edge cloud related network hints from the network event data, and providing, by the processing system, the edge cloud related network hints to the edge cloud resource manager.

Additional aspects include devices, non-transitory machine readable medium, and methods for providing an authentication nonce to the UE device, wherein the request for the edge cloud related network hints incudes the authentication nonce; providing the edge cloud related network hints to an edge application master node; providing the edge cloud related network hints to an edge cloud platform; receiving network event data generated when the UE device attaches to, or detaches from, a network; and providing hints to boot or migrate an application container.

Referring now to FIG. 1, a block diagram is shown illustrating an example, non-limiting embodiment of a system 100 in accordance with various aspects described herein. For example, system 100 can facilitate in whole or in part a network API service that combines data from access and core networks and provides guidance and control services to API users. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

The communications network 125 also includes network API service 158. As further described below with reference to later figures, network API service 158 receives network event data from various network elements and access networks, and then provides hints to various entities to enable application container provisioning in the cloud. For example, network API service 158 may register to receive network event data from access networks such as wireless access 120, broadband access 110, voice access 130, media access 140, and the like. Also for example, network API service 158 may register to receive network event data from network elements within a core network such as NEs 150, 152, 154, and 156 within communications network 125.

In some embodiments, network API service 158 may register to receive network event data from various sources. For example, network API service 158 may receive network event data from multiple access networks (e.g., cellular, fixed-access) as well as core networks (e.g., mobility core, IP backbone). Examples of network event data include data reflecting messages that pass between the UE and a radio access network, between a UE and a core network, between a radio access network and a core network, and the like. In some embodiments, the network event data provides information alerting network API service 158 that a UE is attaching to a radio access network, detaching from a radio access network, or being handed over from one node to another node in a radio access network. Any available network event data may be utilized as described herein. Network API service 158 may also provide a predictor that ingests data streams of network event data from multiple sources and outputs edge cloud related hints to allow an edge cloud resource manager to boot application containers in an efficient manner. In some embodiments, the edge cloud resource manager may be an edge application master node that manages containers and application instances for a particular software application to serve the UE, and in other embodiments, the edge cloud resource manager may be a resource manager controlled by the edge cloud provider. These and other embodiments are more fully described below with reference to later figures.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
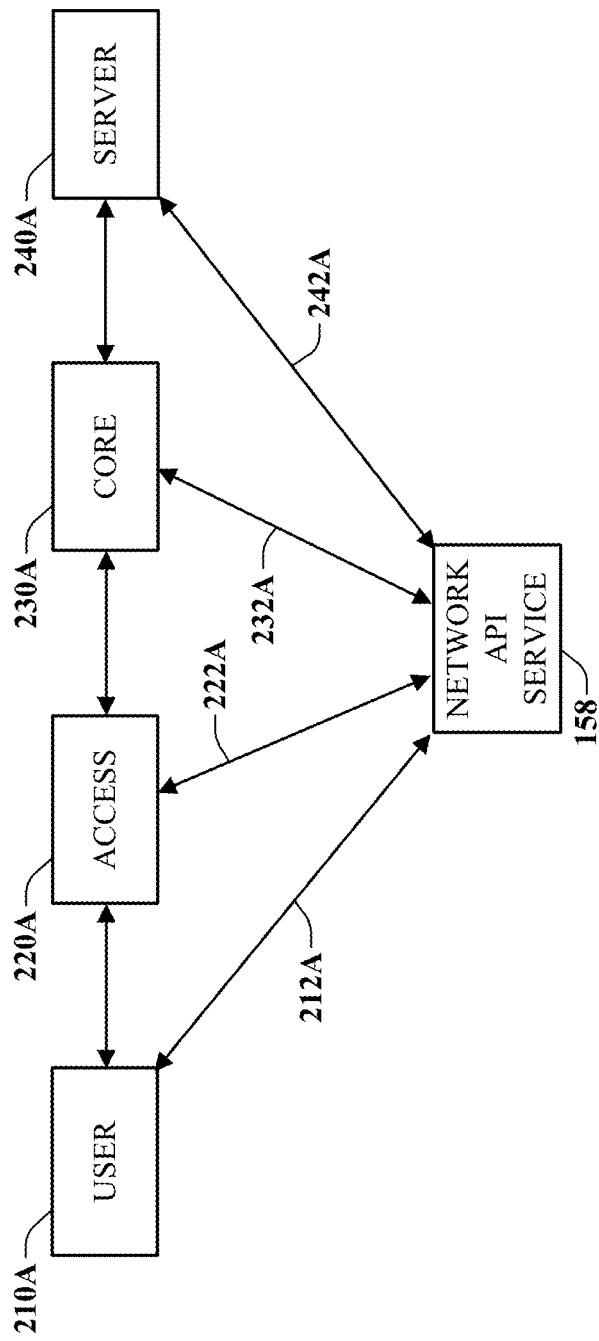
FIG. 2A is a block diagram illustrating an example, non-limiting embodiment of a network application programming interface (API) service functioning within the communication network of FIG. 1 in accordance with various aspects described herein.

FIG. 2A is a block diagram illustrating an example, non-limiting embodiment of a network application programming interface (API) service functioning within the communication network of FIG. 1 in accordance with various aspects described herein. FIG. 2A shows network API service 158 communicating with user equipment (UE) 210A, access network 220A, core network 230A, and server application 240A. UE 210A may be any device capable of communicating with access network 220A and network API service 158. For example, UE 210A may be cellular user equipment, set top boxes or routers, or other customer premise equipment. Also for example, UE 210A may be an Internet of Things (IoT) device, such as a smart appliance, a connected water or power meter, a camera, or the like. Also for example, UE 210A may be limited to a single application or program being executed on a user device. An example application may be an app on a smartphone, a video application on a smart TV, or a navigation app in an automobile. In some embodiments, UE 210A may support multiple access networks. For example, UE 210A may be capable of connecting to a cellular radio access network, a Wi-Fi access point, a tethered broadband connection, or any other type of access network. The terms "user device" and "user equipment" are used interchangeably herein.

Access network 220A may be any type (or any number) of access networks that enables UE 210A to communicate with core network 230A. For example, access network 220A may be any of the access networks described above with reference to FIG. 1. Access network 220A may include many devices or elements capable of providing data to network API service 158 at 222A. For example, access network 220A may include network routers, switches, cellular base stations, and the like.

Core network 230A may be any communications network capable of providing services to UE 210A through an access network, such as access network 220A. For example, core network 230A may be implemented as communications network 125 (FIG. 1). In some embodiments, core network 230A provides an entry point to data networks for user devices. For example, core network 230A may access data networks outside of core network 230A to provide connectivity between external networks and UE 210A. Also for example, core network 230A may provide connectivity to a server such as server 240A.

In some embodiments, server 240A may be a hardware server upon which applications may execute, where those applications provide services to UE 210A. Also in some embodiments, server 240A may be a virtual machine or virtual network element executing on hardware within core 230A, in a cloud environment, or in a distributed environment.

In some embodiments, network API service 158 may receive network event data from one or more of the elements shown in FIG. 2A, predict UE behavior based on the network event data, and may then provide performance hints to one or more of the same elements shown FIG. 2A. For example, network API service 158 may receive network event data from access network 220A at 222A and/or core network 230A at 232A. Examples include current attachment events and messages, detachment events and messages, messages signaling UE handover events, and the like.

In some embodiments, network elements within core network 230A and elements within access network 220A offer services to provide network event data, and network API service 158 may subscribe to these services. In some embodiments, elements within access network 220A and core network 230A may output streams of data or events on a per-user basis or aggregate basis with on/off subscriptions. Data may be collected from these elements on a periodic basis or an on-demand basis. For example, in some embodiments, network event data is collected in real-time as it is generated.

In some embodiments, network API service 158 responds to requests from server 240A to provide performance hints based on the network event data. For example, in some embodiments, network API service 158 may analyze and/or synthesize the network event data, predict operations that may enhance performance of edge cloud entities, and then provide performance hints server 240A. Performance hints may include identification of edge cloud locations at which an application container should be instantiated, commands to boot an application container or virtual machine at a particular edge cloud location, commands to take down an application container or virtual machine at an edge cloud location, or the like.

Figure 2B:
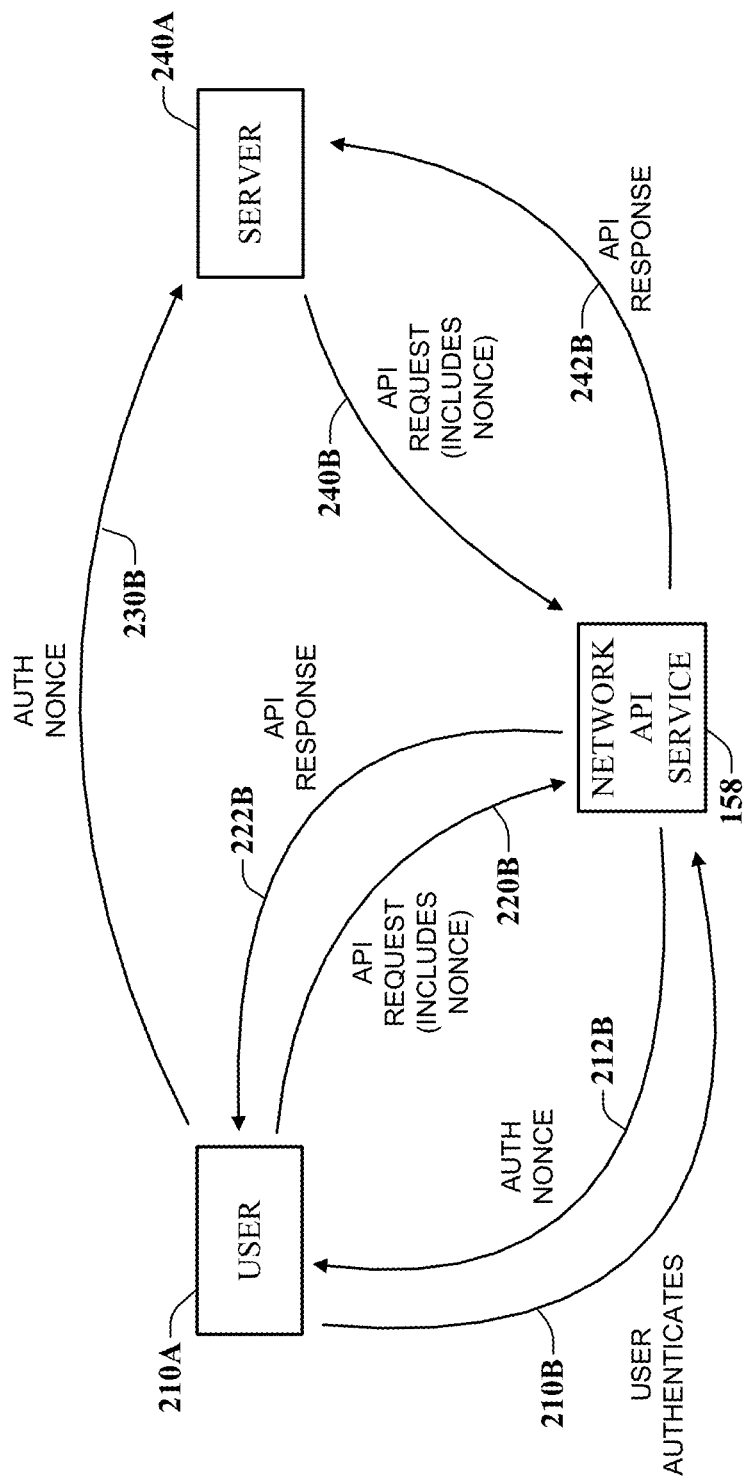
FIG. 2B is a block diagram illustrating an example, non-limiting embodiment of an authentication method in accordance with various aspects described herein.

FIG. 2B is a block diagram illustrating an example, non-limiting embodiment of an authentication method in accordance with various aspects described herein. In some embodiments, network API service 158 requires users of the API service to first be authenticated. The example authentication process shown in FIG. 2B authenticates UE 210A to network API service 158 and then verifies that future API service requests are made by authenticated users or by other elements on behalf of the authenticated users.

UE 210A provides an authentication request to network API service 158 at 210B. In response to the authentication request, network API service 158 determines whether UE 210A is provisioned for network API service privileges. In some embodiments, this may be limited to verifying that UE 210A is a mobility customer of a network operator. In other embodiments, this may include verifying that a user profile includes information specifying that the user has network API service privileges.

The authentication request made at 210B may be performed on behalf of a user, a specific user device, or a specific user application executing on a specific device. For example, when the authentication is on behalf of a user, then that authenticated user may request network API services from any device or any application. Also for example, when the authentication is on behalf of a user device, then that user device may request network API services on behalf of any application running on the user device. Further, when the authentication is on behalf of an application, then API services may be limited to requests made solely by that application. In general, authentication may be performed at any level of granularity and on behalf of any person, hardware device, or process executing on a hardware device.

In response to determining that UE 210A has network API service privileges, network API service 158 provides an authentication nonce to UE 210A at 212B. In some embodiments, the authentication nonce is a one-time-use identifier that uniquely identifies UE 210A as having been authenticated by network API service 158. The authentication nonce may be randomly generated, cryptographically generated, or may be generated using any authentication process. In some embodiments, the authentication nonce represents not only an identifier, but a process. For example, the authentication nonce may be a shared key, a public key, or a cryptographic challenge/response.

Once UE 210A is authenticated, UE 210A may make an API request at 220B. As part of the API request, UE 210A provides the authentication nonce to network API service 158. Network API service 158 verifies the authentication nonce as valid and provides an API response to UE 210A at 222B. The interactions between UE 210A and network API service 158 shown at 210B, 212B, 220B, and 222B represent a user authenticating to a network API service and the network API service limiting access to a user that has been previously authenticated. In some embodiments, network API service 158 will respond to requests from elements that have not been directly authenticated, but have been authorized by authenticated users. These and other embodiments are described further below.

In some embodiments, an authenticated user may provide an authentication nonce to a separate element to authorize that separate element to access network API services on behalf of the authenticated user. For example, as shown in FIG. 2B, UE 210A may provide the authentication nonce to server 240A at 230B. Server 240A may perform an API request at 240B. The API request at 240B may include the authentication nonce provided by UE 210A. In response to the API request at 240B, network API service 158 verifies the authentication nonce as valid and provides an API response to server 240A at 242B.

In some embodiments, authentication to network API service 158 is limited to users such as UE 210A, and does not allow direct authentication by other elements such as server 240A. In other embodiments, elements other than users may be provided direct authentication methods thereby allowing a server such as server 240A to provide its own authentication nonce when performing an API request.

Figure 2C:
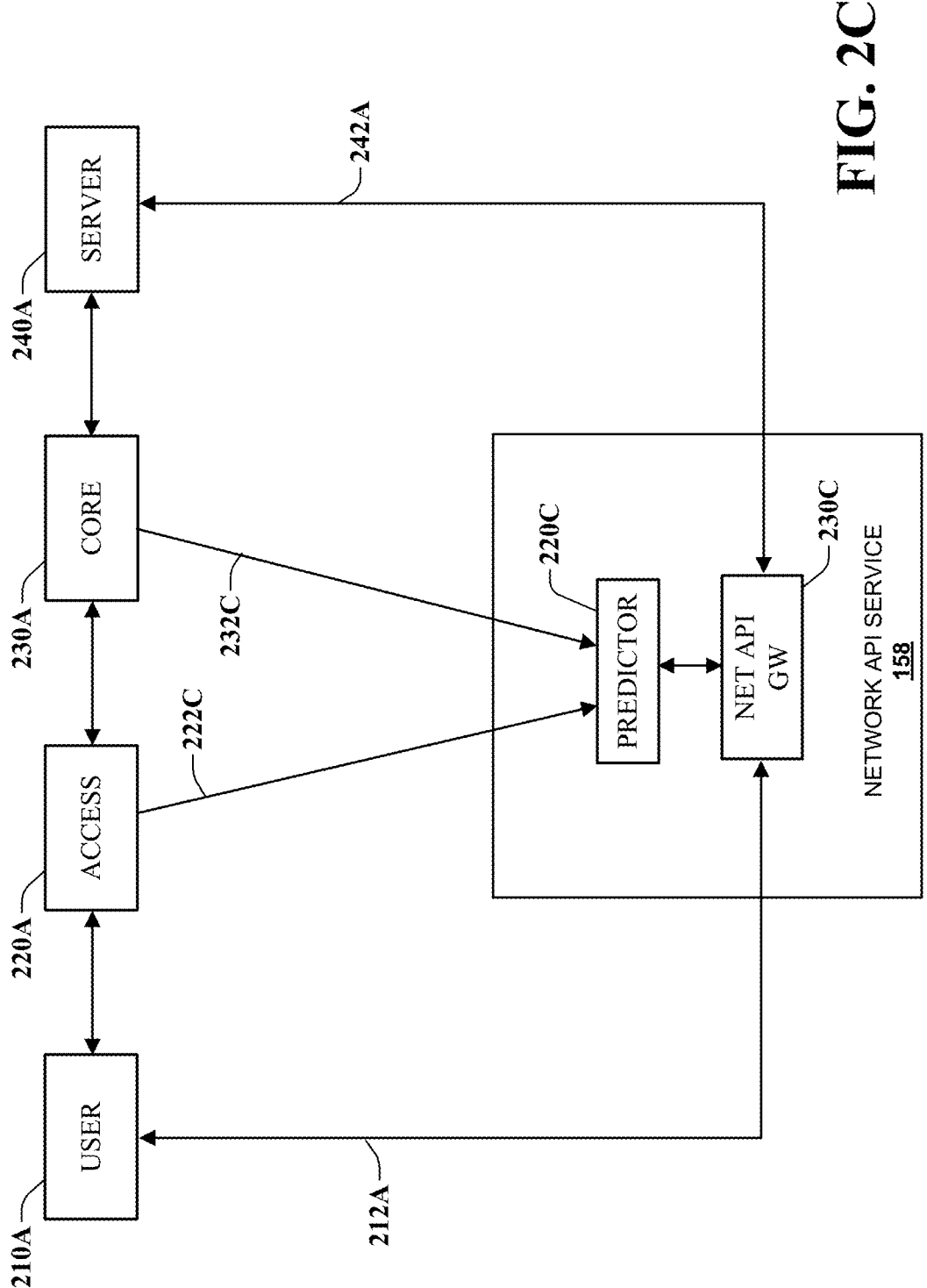
FIG. 2C is a block diagram illustrating an example, non-limiting embodiment of a network API service providing guidance functionality in accordance with various aspects described herein.

FIG. 2C is a block diagram illustrating an example, non-limiting embodiment of a network API service providing guidance functionality in accordance with various aspects described herein. As shown in FIG. 2C, network API service 158 includes predictor 220C and network API gateway 230C. In some embodiments, predictor 220C receives network event data from access network 220A and/or core network 230A, and predicts actions that will enhance performance based on the received network event data. For example, predictor 220C may receive network event data from access network 220A alerting predictor 220C that UE 210 is beginning an attach procedure. In response to this network event data, predictor 220C may predict that booting an application container at a specific edge cloud location may enhance performance.

Predictor 220C may be implemented in any manner. For example, predictor 220C may be a process or program running on a virtual machine or server, and may also be implemented in a distributed manner. Predictor 220C may include storage or may be stateless. For example, in some embodiments, predictor 220C may analyze received network event data without providing for long term storage for the results.

Network API gateway 230C provides an external interface for API network service 158. For example, network API gateway 230C may provide a list of APIs available to applications, provide a mechanism to register applications and authenticate users, and to request user consent to release data.

In operation, network API service 158 receives network event data from various elements as shown in FIG. 2C. For example, access network 220A may provide network event data at 222C and core network 230A may provide network event data at 232C. The network event data may be collected periodically or in response to events. For example, access network 220A may provide network event data when a particular user authenticates to the access network. Also for example, network API service 158 may subscribe to one or more services published by elements within access network 220A to receive network event data either on a periodic basis or as a result of network events. Similarly, core network 230A may provide network event data either on a periodic basis or as a result of network events. Various network elements within core network 230A may publish services to provide network event data, and network API service 158 may subscribe to those services within core network 230A to receive network event data either on a periodic basis or as a result of network events.

Predictor 220C may provide any type of analytics or synthesis in support of the operation of network API service 158. For example, predictor 220C may consume raw data streams from network elements within access network 220A and/or core network 230A to produce performance hints in real time. Also for example, in some embodiments, predictor 220C may perform future predictions from past data. Examples include predictions of particular applications to be used by UE 210A, particular locations which UE 210A may occupy, and likely future handoff scenarios. In some embodiments, predictor 220C may provide user specific predictions or provide predictions for classes of users (e.g., users in a given location, time of day, device type, etc.). Also for example, predictor 220C may keep historical records of predictions to be used for future predictions. The historical records may be maintained on an aggregate basis, on a per-user basis, or any other basis.

Network API gateway 230C may provide authentication services to applications, user devices, or users. For example, as discussed above with reference to FIG. 2B, network API gateway 230C may receive authentication requests, determine that the requestor has sufficient privileges, and then provide an authentication nonce to the requestor. Network API gateway 230C may also receive requests for API services.

In some embodiments, network API gateway 230C may also receive API requests from entities that have not been directly authenticated. For example, network API gateway 230C may receive an API request from server 240A. In some embodiments, server 240A may provide, as part of the API request, an authentication nonce previously registered to a user device. In other embodiments, server 240A may identify UE 210A in some other manner as part of the API request. In these embodiments, network API gateway 230C may request permission from UE 210A to respond to server 240A. UE 210A may grant or deny the permission. When server 240A has the appropriate permission, via an authentication nonce or other mechanism, network API gateway 230C utilizes predictor 220C to respond to the API request.

In some embodiments, server 240A, after receiving performance hints from network API service 158, may perform server-side adaptations. For example, server 240A may boot an application container in a specific edge cloud location in response to performance hints received from network API service 158. In general, server 240A may take any action or perform any adaptation in response to performance hints received from network API service 158 in response to API requests.

Figure 2D:
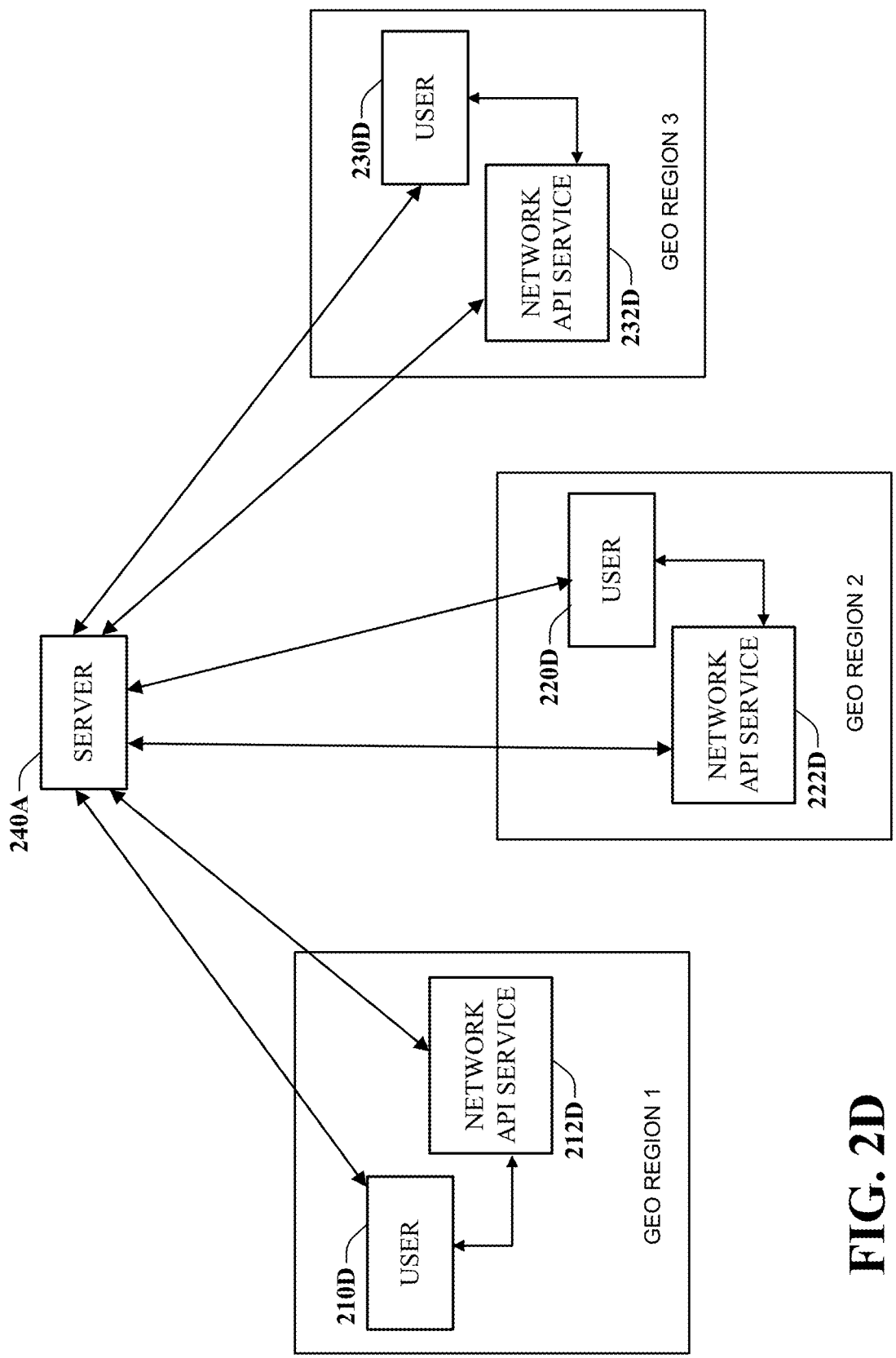
FIG. 2D is a block diagram illustrating an example, non-limiting embodiment of a distributed network API service in accordance with various aspects described herein.

FIG. 2D is a block diagram illustrating an example, non-limiting embodiment of a distributed network API service in accordance with various aspects described herein. The network API service shown in FIG. 2D is distributed across three geographical regions. For example, network API service 212D is located in geographical region one, network API service 222D is located in geographical region two and network API service 232D is located in geographical region three. In some embodiments, the different network API services are implemented in a network core or on network edges, or in cloud-based network edge locations. In some embodiments, users in a particular geographical region are redirected to network API services that are physically located in the same geographical regions when requesting network API services. For example, user 210D may make a request of a centralized network API service such as network API service 158 (FIG. 2A), and user 210D may be redirected to network API service 212D to reduce latency and network bandwidth consumption. Similarly, user 220D may be redirected to network API service 222D and user 230D may be redirected to network API service 232D.

In some embodiments, network API services in different geographical regions subscribe to the same services to receive identical network event data. In these embodiments, any network API service in any geographical region may have access to the same network event data regardless of user location or API service location. In other embodiments, distributed network API services emphasize the collection of network event data describing network events in their geographical region. In these embodiments, network API services in different geographical regions may have partial overlap of network event data collected and analyzed, but may also receive network event data unique to their geographical region. In these embodiments, a network API service in a particular geographical region may be more likely to receive network event data of interest to a user in the same geographical region.

In some embodiments, a single server such as server 240A in FIG. 2D may communicate with multiple users in different geographic regions. In these embodiments, this single server may communicate with multiple network API services in different locations depending on the geographical regions in which the users operate. For example, if user 210D has authenticated and received an authentication nonce from network API service 212D and provided that authentication nonce to server 240A, server 240A may provide that authentication nonce to network API service 212D when requesting performance hints on behalf of user 210D. Likewise, server 240A may provide an authentication nonce received from user 220D when communicating with network API service 222D, and may use an authentication nonce received from user 230D when communicating with network API service 232D.

Figure 2E:
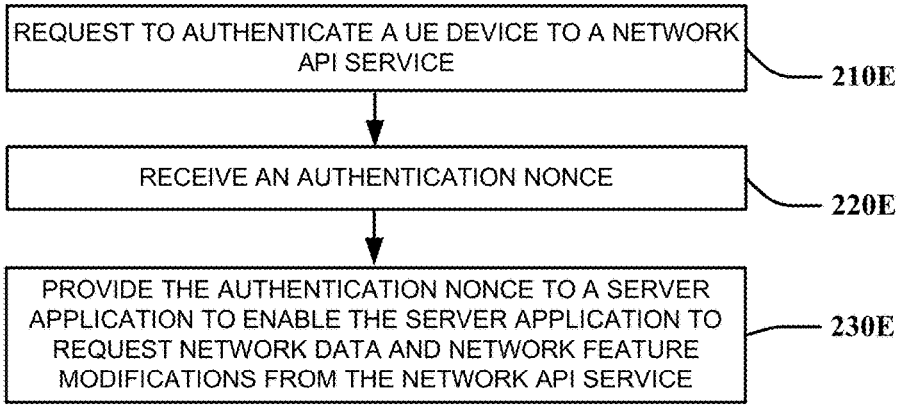
FIGS. 2E-2G depict illustrative embodiments of methods in accordance with various aspects described herein.
Figure 2F:
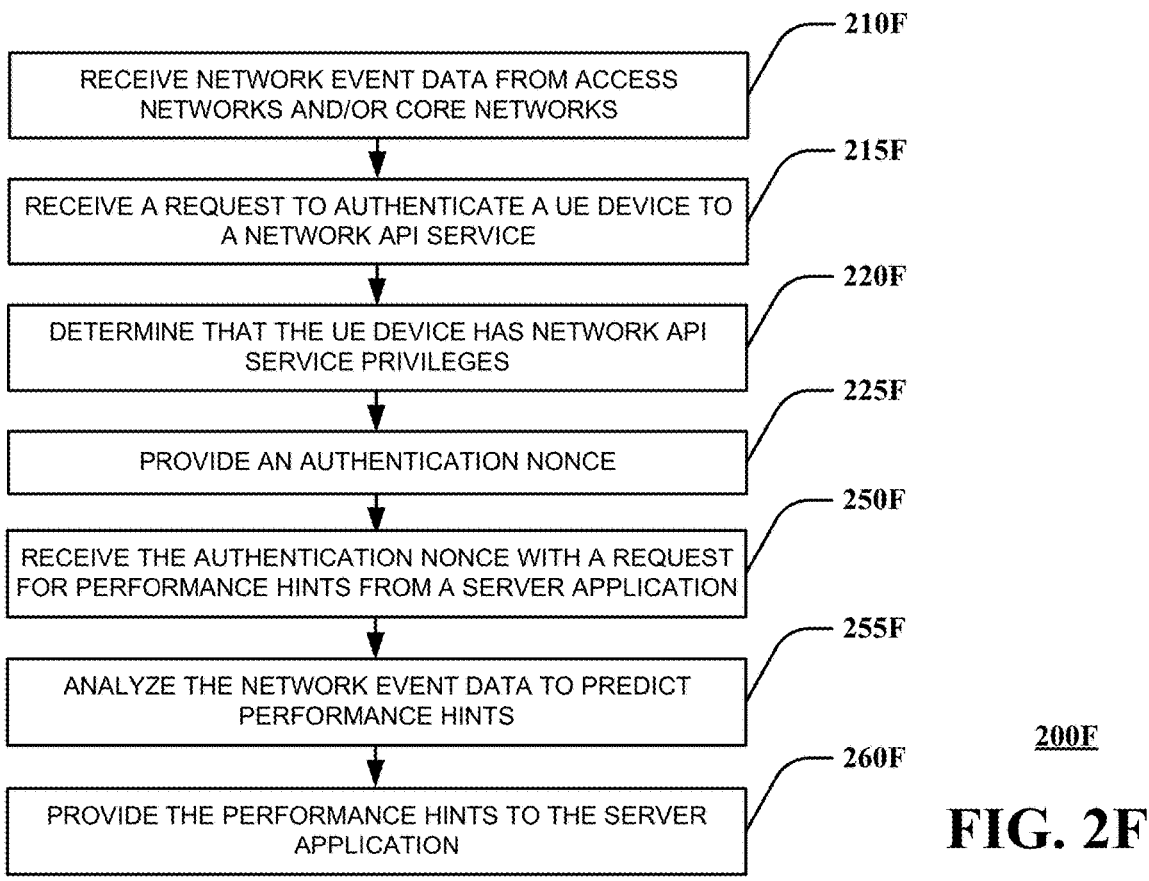
Figure 2G:
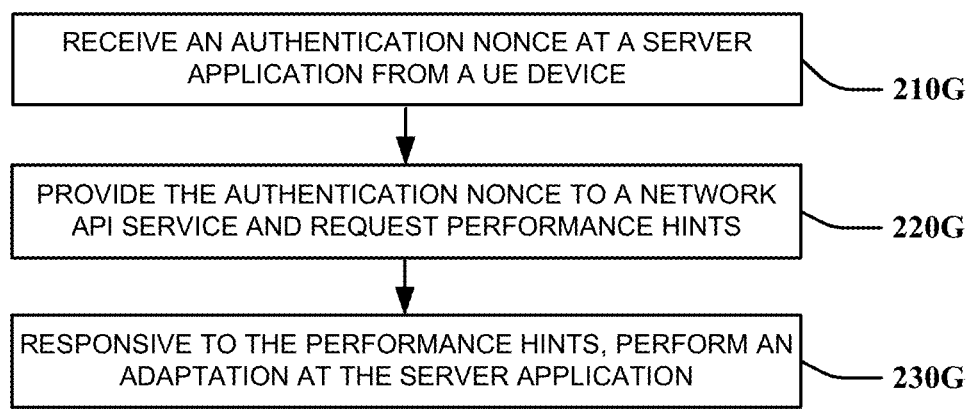

FIGS. 2E-2G depict illustrative embodiments of methods in accordance with various aspects described herein. Referring to FIG. 2E, method 200E may be performed by a user, a user equipment (UE) device, an application running on a UE device, or any other consumer of network API services. For example, the operations of method 200E may be performed by a broadband customer having a tethered connection to a laptop computer, a mobility customer with a handheld device connected to a radio access network, an application running on an infotainment center in an automobile, or the like.

At 210E, a request is made to authenticate a UE device to a network API service. In some embodiments, this corresponds to a UE device requesting authentication from a network API service such as network API service 158. At 220E, an authentication nonce is received. In some embodiments, the authentication nonce is a cryptographic nonce, and in other embodiments the authentication nonce is a one-time-use randomly generated number used as a user-ID. In some embodiments, the authentication nonce is provided only after the UE device has been verified as a device with network API service privileges.

At 230E, the authentication nonce is provided to a server to enable the server to request performance hints from the network API service. In some embodiments, this allows an edge application resource management server to request guidance for management edge cloud resources on behalf of the UE device that was previously authenticated to the network API service. In some embodiments, the UE device performing method 200E may receive, from a network API service, a request to allow a server to access the network API service on behalf of the UE device. In these embodiments, the UE device may grant or deny the permission based on any criteria.

Referring to FIG. 2F, method 200F may be performed by a network API service such as network API service 158. At 210F, network event data is received. In some embodiments, the network event data is collected from access networks, core networks, or any other network element in communication with the network API service.

Example network event data received from an access network may include Radio Resource Control (RRC) connection establishment/RRC idle (another link). For example, messages that may give rise to network data events being reported to a network API service include RRC Connection Request (SRB0, CCCH/UL_SCH/PUSCH), RRC connection setup (SRB0, CCCH/DL-SCH/PDSCH) and RRC Connection SETUP Complete (SRB1, DCCH/UL-SCH/PUSCH). These and other events may include a UE identity to uniquely identify a user, a radio resource identification, or other information useful to determine a UE, a UE location, a UE state of attachment, a radio resource, a radio resource location or the like. In 4G embodiments, when a UE goes from RRC_IDLE to RRC_connected or vice versa, the eNB may report the event to the network API service. Further, in 5G embodiments, transitions between RRC_IDLE, RRC_INACTIVE, and RRC_CONNECTED may be reported to the network API service. In some embodiments, access network events may be received earlier than core network events which may give more time to spin up containers.

Example core network events include attach and detach events and/or handover events. In some embodiments, attach and detach events may include an initial UE attach, and initial context setup request, and/or a UE context release. Also for example, a handover event may include a tracking area update (e.g., a change in UE location), a mobility management unit (MIME) triggered serving gateway relocation (e.g., switching from serving or packet gateway to another serving or packet gateway). Network event data may be received from any type of network core. For example, in some embodiments, events may be received from a 4G MME, and in other embodiments, events may be received from a 5G access and mobility management function (AMF).

In some embodiments, messages passed between a UE, an access network and/or a core network are reported directly to a network API service as network data events. In other embodiments, the network data events reported to the network API service include information related to, or derived from, the messages passed between a UE, an access network and/or a core network. For example, in some embodiments, a radio access network may pass the contents of an RRC connection request to a network API service as a network data event. Also for example, in some embodiments, a radio access network may pass only a portion an RRC connection request to a network API service as a network data event. Also for example, in still further embodiments, a radio access network may pass only a UE identifier, a radio resource identifier, and a connection state to a network API service as a network data event in response to receiving an RRC connection request.

At 215F, a request to authenticate a UE device is received at the network API service. In some embodiments, this corresponds to a request being received on behalf of a user, on behalf of a UE device, or on behalf of an application running on a UE device. For example, the authentication request may provide authentication to all devices registered to a particular user, to the particular device that is communicating the request for authentication, or to a particular application that is running on the UE device requesting authentication.

At 220F, the network API service determines that the UE device has network API service privileges. In some embodiments, this corresponds to verifying that the UE device is registered to a user of a particular service provider. In other embodiments, this corresponds to verifying that a user account corresponding to the UE device or the application requesting authentication has specific privileges to access one or more network API services. At 225F, in response to determining that the UE device has network API service privileges, an authentication nonce is provided to the UE device. In some embodiments, the authentication nonce is a cryptographic nonce, and in other embodiments, the authentication nonce is non-cryptographic.

At 250F, the authentication nonce previously provided to the UE device at 225F is received from a server with a request for performance hints. In some embodiments, this corresponds to a server having received a copy of an authentication nonce from an authenticated user so that the server may request performance hints from a network API service on behalf of the user. At 255F, network event data is analyzed and/or synthesized to predict performance hints. At 260F, the performance hints predicted at 255F is provided to the requesting server. The requesting server may perform adaptations based on the performance hints provided at 260F. For example, the server application may select an edge cloud location to house an application container, boot an application container, or take down an application container in response to performance hints provided at 260F.

Referring to FIG. 2G, method 200G may be performed by a server such as an edge cloud management server. For example, a server running as a virtual machine, or an application running on a virtual machine may perform the various actions of method 200G. At 210G, an authentication nonce is received from a UE device. In some embodiments, this corresponds to a UE device providing an authentication nonce to the server so that the server may request network API services on behalf of the user device. At 220G, the authentication nonce is provided to a network API service to request performance hints. At 230G, responsive to performance hints received at the server, the server performs an adaptation. For example, the server may select an edge cloud location to house an application container, boot an application container, or take down an application container in response to performance hints provided at 230G. In response to received performance hints, a server may create or destroy containers. For example, in response to a UE context release the server may destroy one or more containers. Also for example, in response to an initial UE attach, the server may create one or more containers. In still further examples, if a serving or packet gateway relocation results from a handover, the server may move a container from one edge cloud location to another edge cloud location. These and other embodiments are described further below.

Figure 2H:
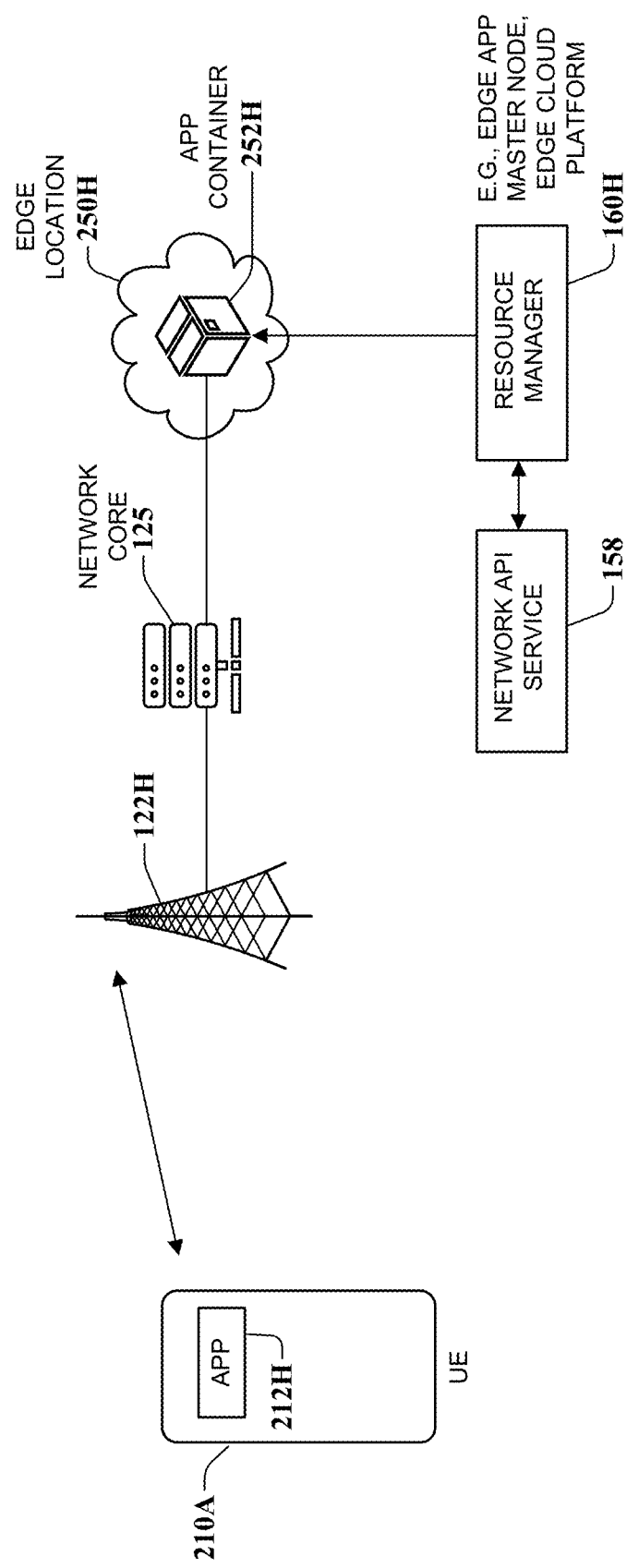
FIG. 2H is a block diagram illustrating an example, non-limiting embodiment of a resource manager interacting with a network API service in accordance with various aspects described herein.

FIG. 2H is a block diagram illustrating an example, non-limiting embodiment of an application container at a first edge cloud location in accordance with various aspects described herein. FIG. 2H shows UE 210A, application 212H, radio access network node 112H, network core 125, edge cloud location 250H with application container 252H, network API service 158, and resource manager 160H. UE 210A is described above with reference to previous figures. Application 212H may be any application running on UE 210A. For example, application 212H may be a video application on a mobile device, an entertainment application within an automobile, an application running on a laptop device connected to a Wi-Fi access point, or the like.

Radio access network node 122H may be any radio access network node capable of communicating with UE 210A. For example, in some embodiments, radio access network node 122H is one of the radio access network nodes described with reference to FIG. 1. In some embodiments, radio access network node 122H may be a 4G radio access network node, and in other embodiments, radio access network node 122H may be a 5G radio access network node.

Network core 125 includes any of the network elements described with reference to FIG. 1. In general, network core 125 may be any network capable of providing services to UE 210A through radio access network node 122H.

Edge cloud location 250H is one of many possible edge cloud locations. For example, an edge cloud platform provider may provide for many different possible edge cloud locations at which application containers may be instantiated. For example, various edge cloud locations may be physically located near serving gateways, packet gateways, or other user plane functions through which data is routed. Utilizing edge cloud locations in physical proximity to these gateways or user plane functions may provide for decreased latency and/or increased functionality in general.

Application container 252H is an application container running at edge cloud location 250H. For example, edge cloud location 250H may include any combination of physical servers and virtual servers, and application container 252H may be container running on any one or multiple of these servers. In some embodiments, application container 252H is specific to a user. For example, application container 252H may house one or more applications specific to a user of UE 210A. Also for example, in some embodiments, application container 252H may be specific to an application or an application type. For example, application container 252H may include applications that communicate with application 212H and/or a multiple instantiations of application 212H.

Network API service 158 receives network event data from various entities and provides performance hints as described above. For example, in some embodiments, network API service 158 may receive network event data from an access network that includes radio access network node 122H. In some embodiments, network API service 158 receives network event data directly from radio access network node 122H. Also for example, network API service 158 may receive network event data from network elements within network core 125. In response to network event data received from various elements within the network, network API service 158 may provide performance hints to resource manager 160H.

Resource manager 160H is an entity that manages resources within various edge cloud locations. For example, in some embodiments, resource manager 160H is provided by an edge cloud service provider and manages many or all functions having to do with network services provided at network edge locations. For example, an edge cloud platform resource manager may boot application containers in one or many different edge cloud locations corresponding to services provided by the edge cloud platform service provider. Also for example, resource manager 160H may be an edge application master node which manages all processes associated with a particular application. For example, application 212H may be a video application, and resource manager 160H may manage all application containers instantiated at edge cloud locations that provide services to application 212H. Resource manager 160H may be any type of entity or process capable of utilizing performance hints provided by network API service 158 in the management of application containers at edge cloud locations.

An edge cloud platform may include of any number of edge cloud locations implemented in small data centers deployed at hundreds of locations within a network. For example, an edge cloud platform may include many geographically distributed edge cloud locations such as edge cloud location 250H. Resource allocation may be challenging at an edge cloud location in part because of their small size and the utility of supporting a variety of applications. In some embodiments, a large number of applications may be supported using containers or lightweight virtual machines that consume far fewer resources than having a dedicated server or a traditional virtual machine for each application; however, it may not be possible to simultaneously run all application containers for all users due to limited resources. In addition, since a user may use an application only a fraction of the time, constantly running application containers for all users and/or applications may be wasteful of compute resources. Various embodiments described herein may provision application containers "just-in-time" upon the arrival of a new request from a user. This saves compute resources and is relatively fast since containers can be started or stopped quicker than virtual machines; however just-in-time provisioning may still have a noticeable impact on user-perceived response time while the container boots up for a few seconds. Further embodiments described herein may reduce the impact on user-perceived response times in part by predicting via network event data that an application may be used before the arrival of a user request.

Figure 2I:
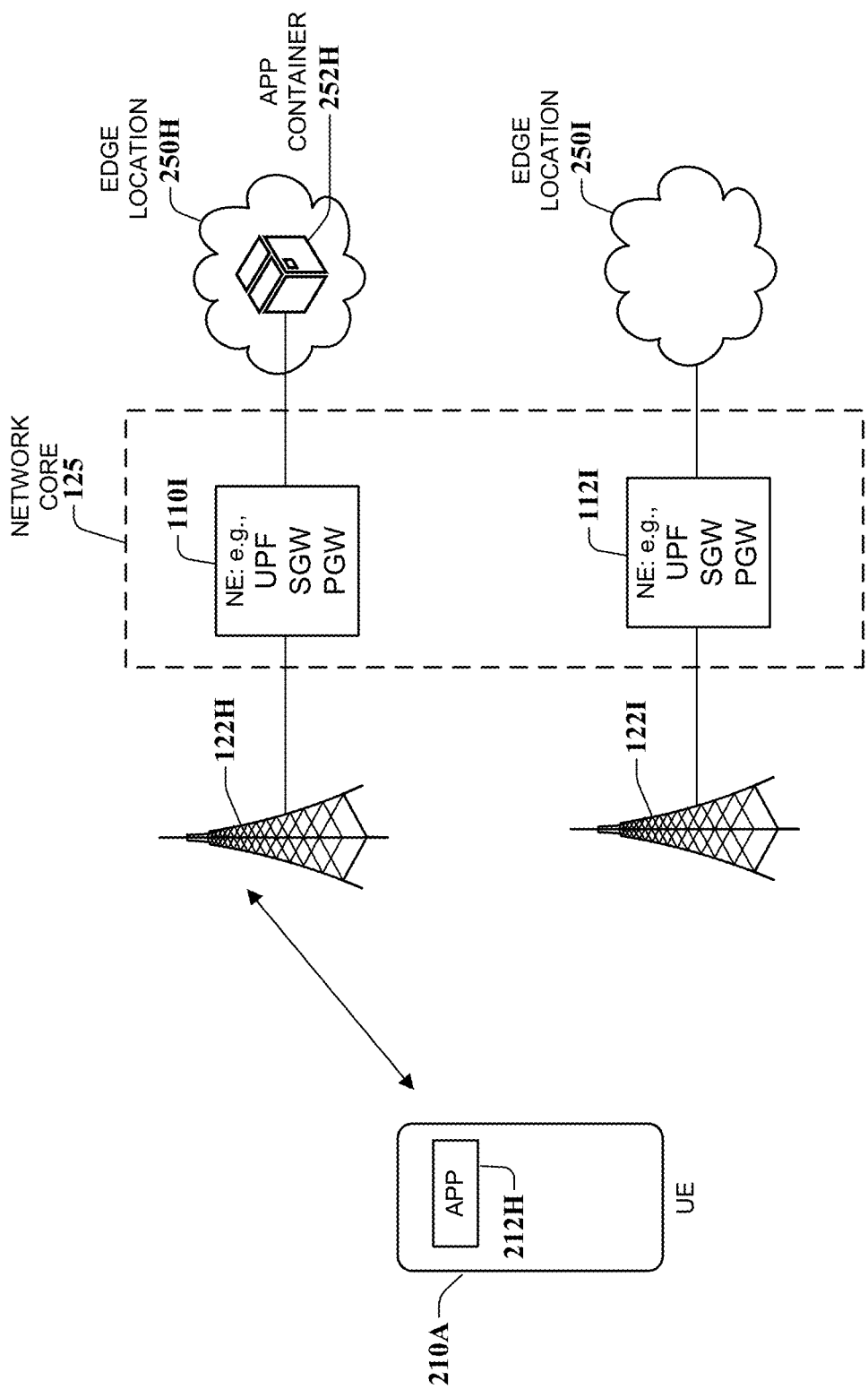
FIG. 2I is a block diagram illustrating an example, non-limiting embodiment of an application container at a first edge cloud location in accordance with various aspects described herein.

FIG. 2I is a block diagram illustrating an example, non-limiting embodiment of an application container at a first edge cloud location in accordance with various aspects described herein. FIG. 2I shows UE 210A communicating with radio access network node 122H. FIG. 2I also shows radio access network node 122H communicating with application container 252H at edge cloud location 250H through a network element 110I which is part of network core 125. Network element 110I may be any network element capable of providing a data path between radio access network node 122H and edge cloud location 250H. For example, network element 110I may be a user plane function, a serving gateway, a packet gateway, or the like. Communications between radio access network node 122H and edge cloud location 250H may in general take any path through network core 125 without limitation. FIG. 2I also shows radio access network node 122I, network element 112I, and edge cloud location 250I. In embodiments represented by FIG. 2I, UE 210A is located physically such that it communicates with radio access network node 122H rather than network access node 122I. In some embodiments, network API service 158 (not shown) receives network event data from one or both of radio access network node 122H and network core 125 and provides performance hints to a resource manager that boots application container 252H at edge cloud location 250H.

Figure 2J:
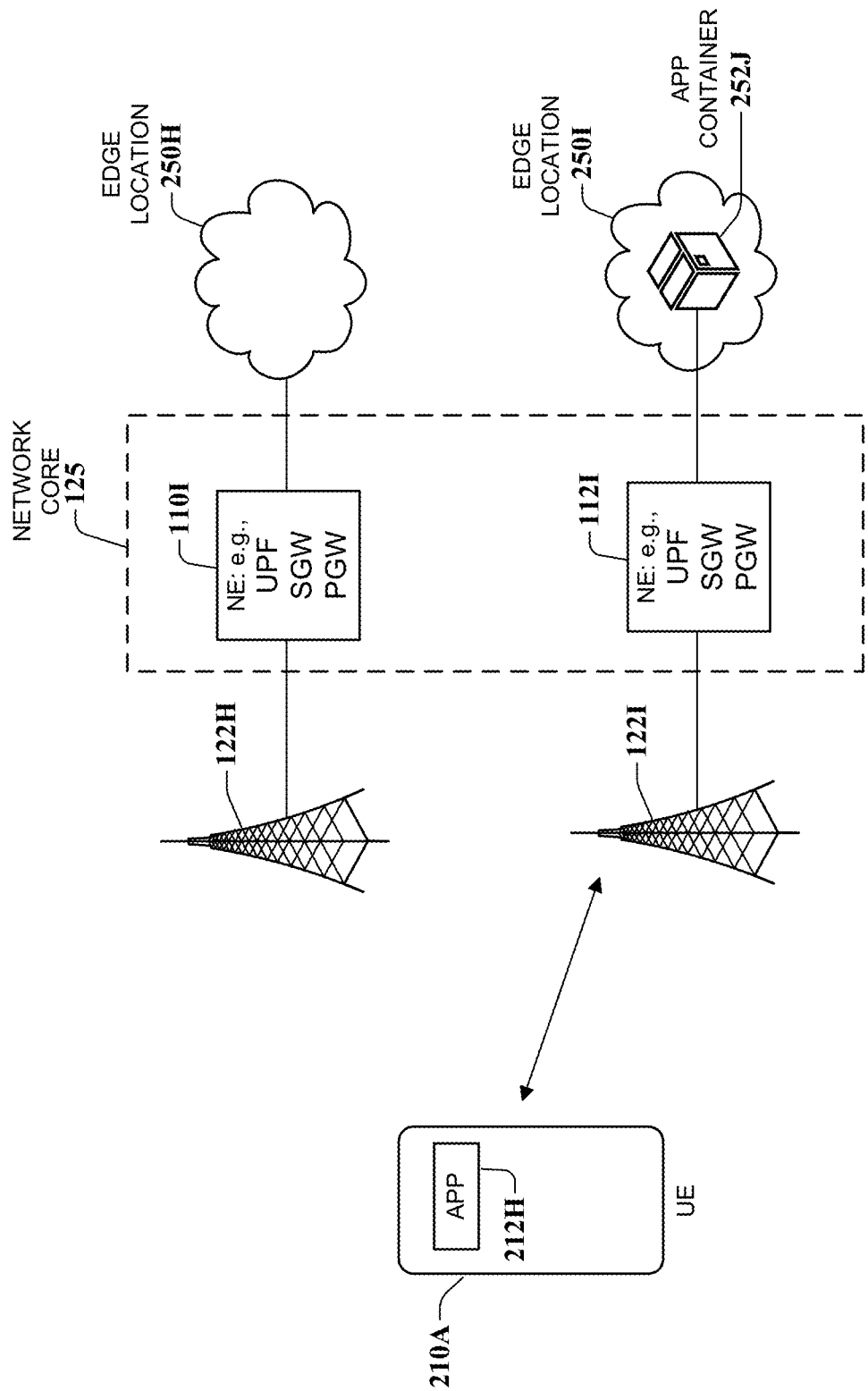
FIG. 2J is a block diagram illustrating an example, non-limiting embodiment of an application container moving from a first edge cloud location to a second edge cloud location in accordance with various aspects described herein.

FIG. 2J is a block diagram illustrating an example, non-limiting embodiment of an application container moving from a first edge cloud location to a second edge cloud location in accordance with various aspects described herein. FIG. 2J shows the same elements as FIG. 2I, with the exception that UE 210A has been handed over from radio access network node 122H to radio access network node 122I. In some embodiments, this corresponds to UE 210A physically moving and the radio access network recognizing a location change and handing over communications from radio access network node 122H to radio access network node 122I. In some embodiments, in response to network event data resulting from the handover shown in FIG. 2J, network API service 158 (not shown) provides performance hints to a resource manager, and the resource manager takes down the application container that was running at edge cloud location 250H and boots an application container 252J at edge cloud location 250I. As shown in FIG. 2J, the communications path is now from UE 210A through radio access network node 122I and network element 112I to application container 252J running at edge cloud location 250I.

Performance hints provided by network API service 158 may be used for any purpose, including booting up application containers as well as shutting down or deleting application containers. For example, when a user disconnects from the network or its network traffic become idle, the network API service may hint the edge cloud to delete one or more application containers. An example of such an event from the radio access network is an RRC_IDLE event, which shows that user has been idle for last X seconds. In some embodiments, a lack of network traffic may also be reported by a packet gateway (5G UPF or 4G SAEGW) that may process all traffic. Further, mobility management (4G MME, or 5G AMF) may report if a user has explicitly deregistered from the network or its connection is terminated by the network. Using these hints to deallocate resources may free up resources at an edge cloud to potentially server other active users and their applications.

Figure 2K:
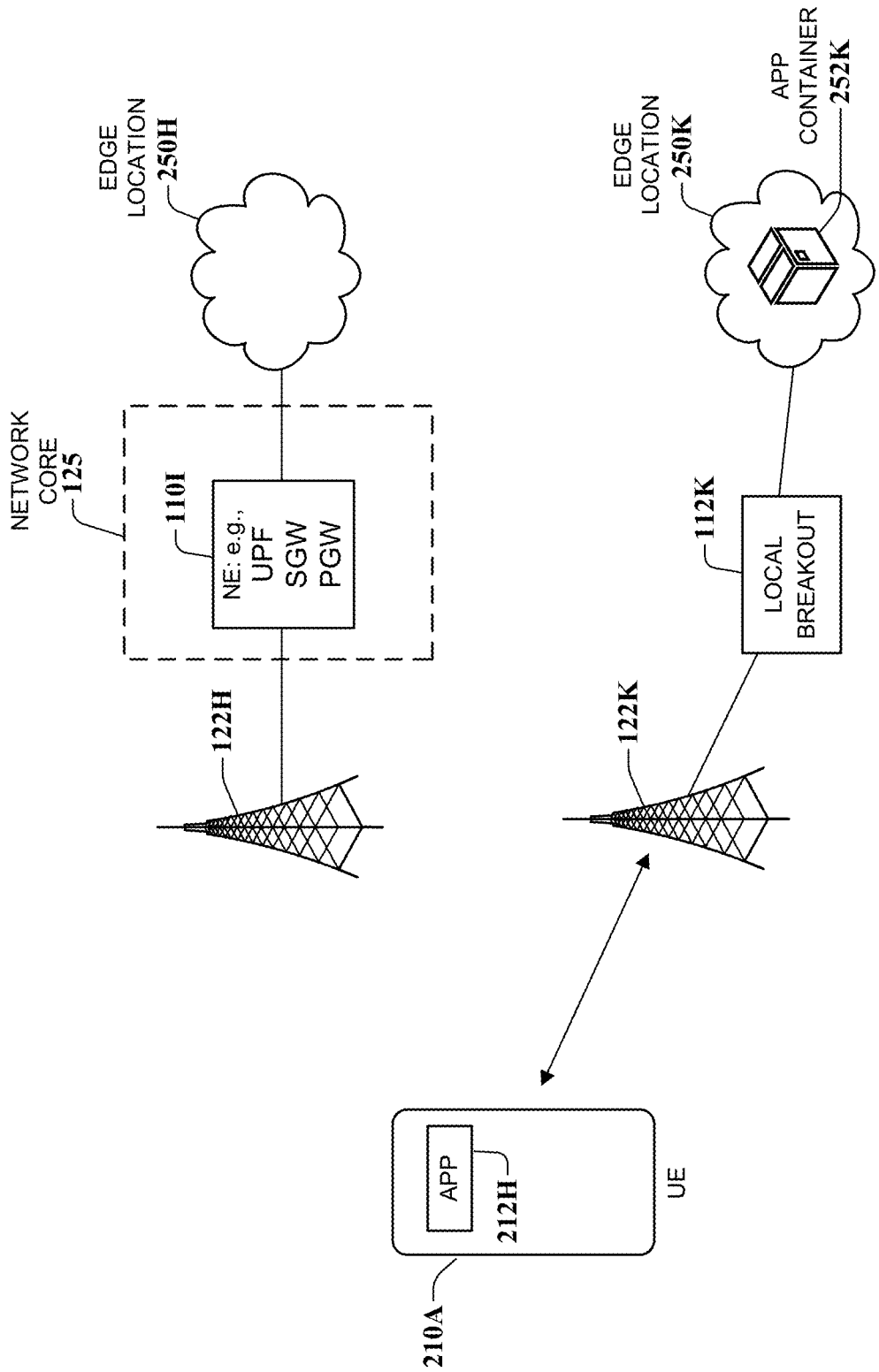
FIG. 2K is a block diagram illustrating an example, non-limiting embodiment of an edge cloud platform locating an application server in an edge cloud location that communicates through a local breakout function in accordance with various aspects described herein.

FIG. 2K is a block diagram illustrating an example, non-limiting embodiment of an edge cloud platform locating an application server in an edge cloud location that communicates through a local breakout function in accordance with various aspects described herein. Similar to FIG. 2J, FIG. 2K shows a hand over of UE 210A between radio access network nodes. In the example of FIG. 2K, the radio access network has handed off UE 210A from radio access network node 122H to radio access network node 122K. Radio access network node 122K communicates with edge cloud location 250K through a local breakout 112K. In some embodiments, a local breakout 120K provides a more efficient path to an edge cloud location rather than going through an entire network core such as network core 125. In some embodiments, a local breakout such as local breakout 112K may be a lightweight network function within network core 125 or may bypass network core 125 altogether to provide a more efficient path to an edge cloud location such as edge cloud location 250K. In response to network event data received as part of the handover, a network API service may provide performance hints to a resource manager that may tear down an application container at edge cloud location 250H and instantiate application container 252K at edge cloud location 250K.

Figure 3:
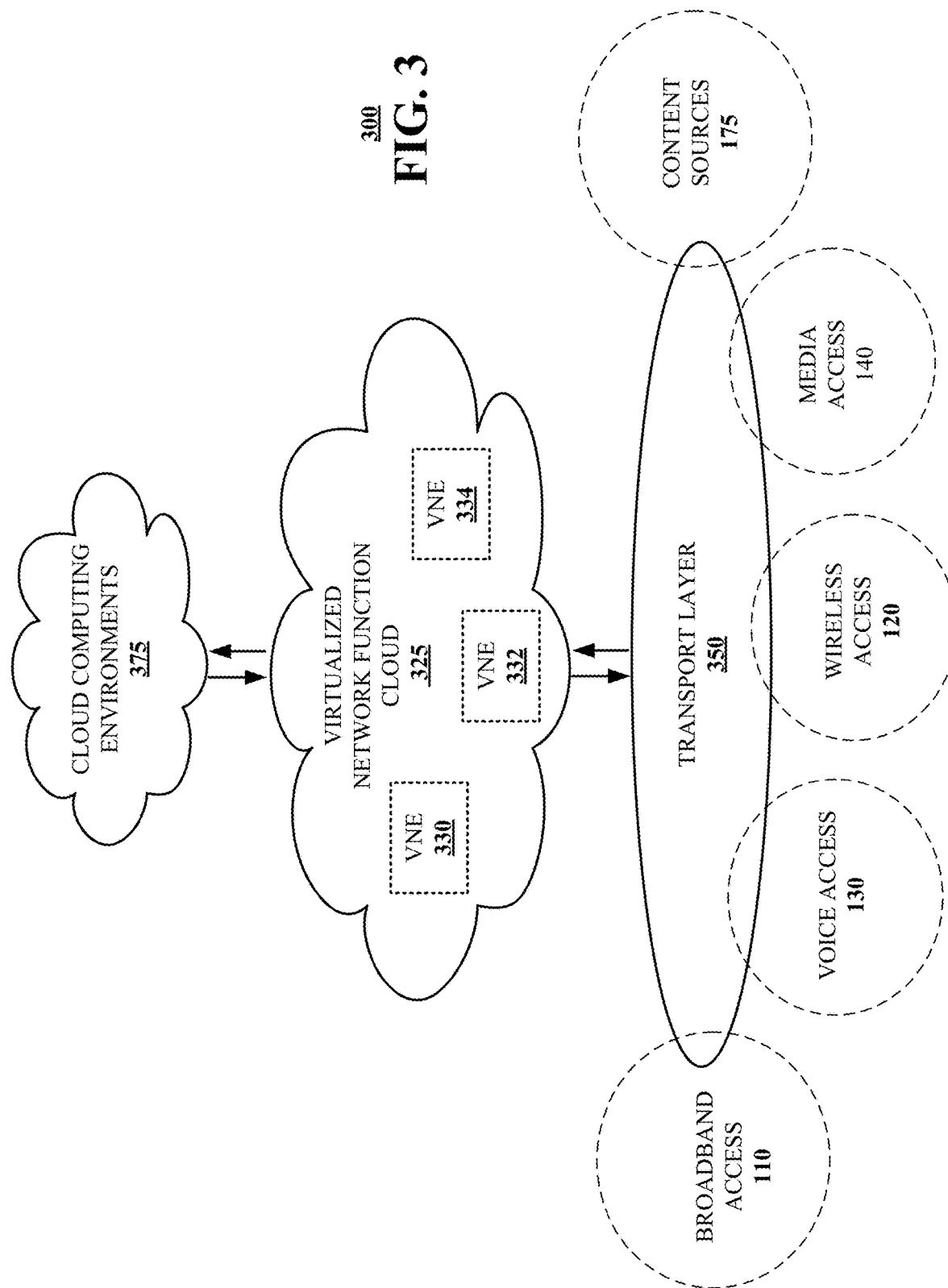
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 100, the subsystems and functions of the systems and methods presented in previous figures. For example, virtualized communication network 300 can facilitate in whole or in part a network API service that combines data from access and core networks and provides guidance and control services to API users.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
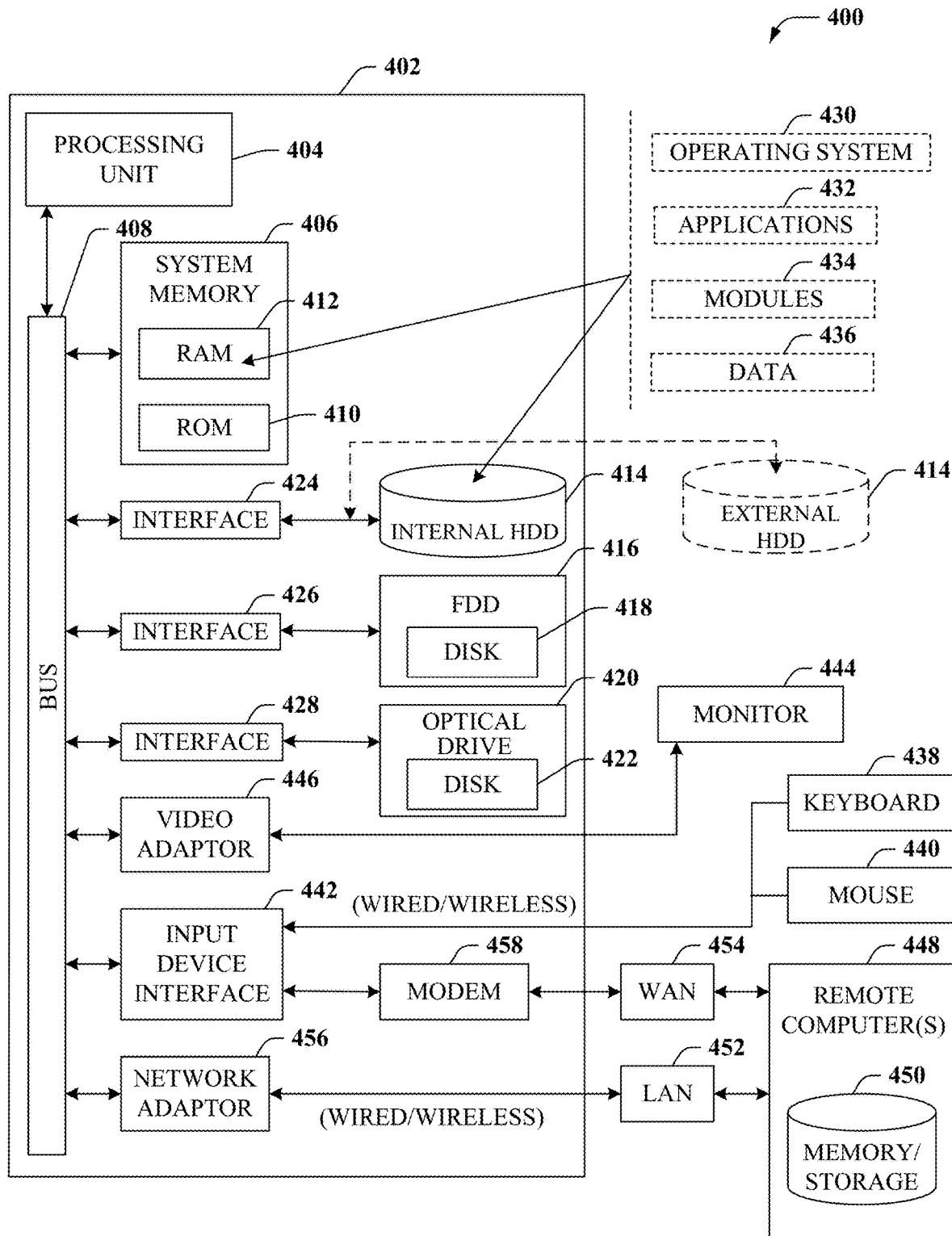
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a network API service that combines data from access and core networks and provides guidance and control services to API users.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
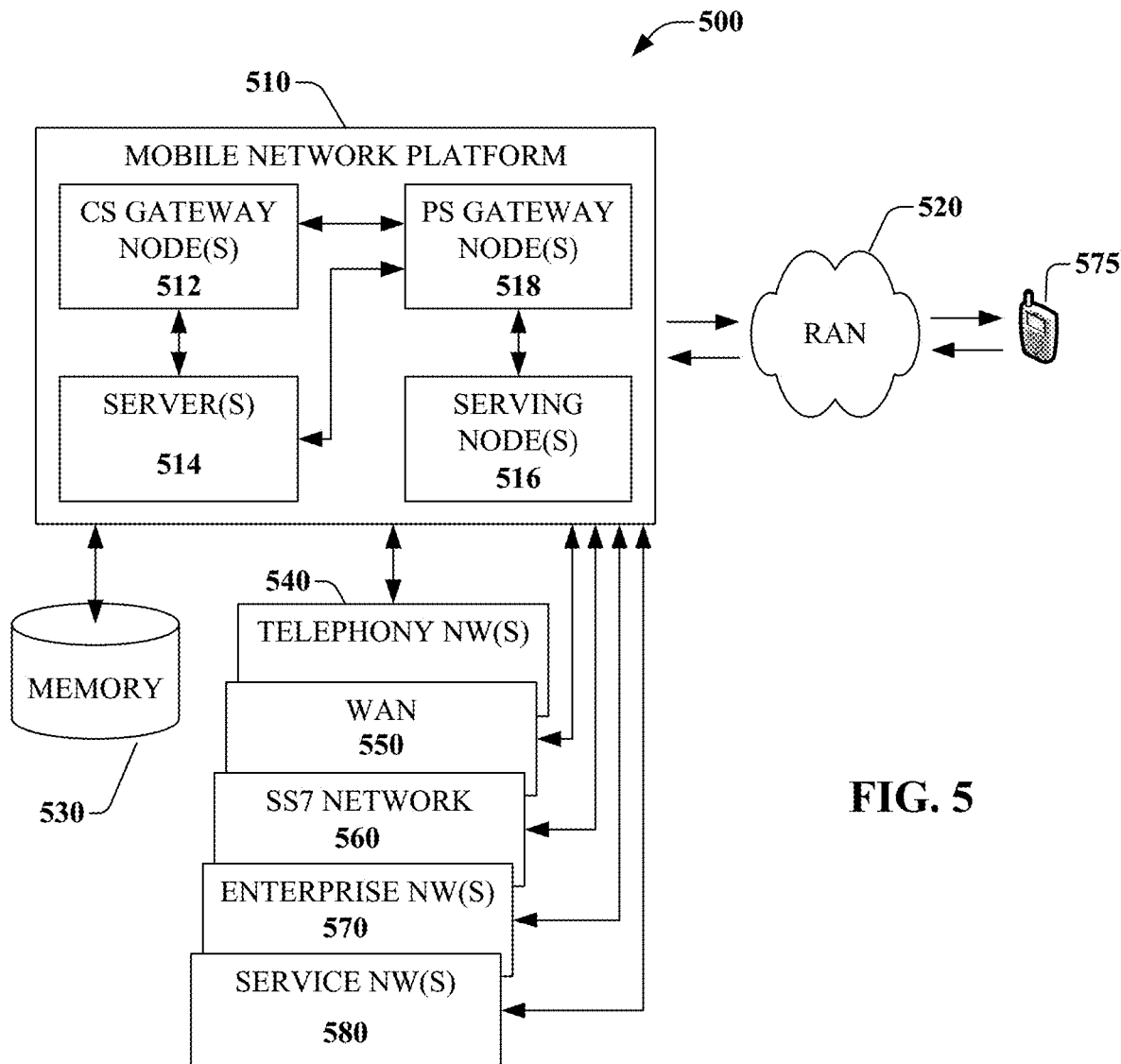
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a network API service that combines data from access and core networks and provides guidance and control services to API users. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
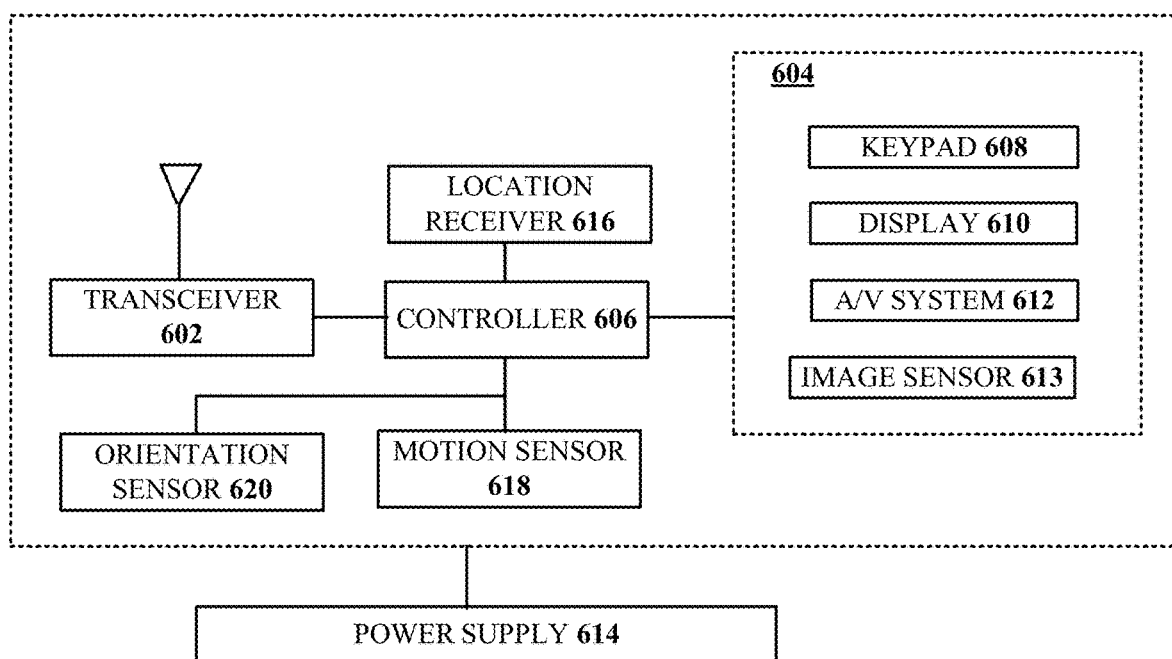
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a network API service that combines data from access and core networks and provides guidance and control services to API users.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving a request to authenticate a user equipment (UE) device to a network application programming interface (API) service;
determining that the UE device has network API privileges;
providing an authentication nonce to the UE device;
receiving, via the network API service, a request for edge cloud related network hints from an edge cloud resource manager, wherein the edge cloud related network hints are specific to the UE device, wherein the request for edge cloud related network hints includes the authentication nonce previously provided to the UE device, indicating that the UE device has authorized the edge cloud resource manager to access network API services on behalf of the UE device;
receiving network event data related to the UE device;
creating the edge cloud related network hints from the network event data; and
providing the edge cloud related network hints to the edge cloud resource manager.

2. The device of claim 1, wherein the providing the edge cloud related network hints to the edge cloud resource manager comprises providing the edge cloud related network hints to an edge application master node.

3. The device of claim 1, wherein the providing the edge cloud related network hints to the edge cloud resource manager comprises providing the edge cloud related network hints to an edge cloud platform.

4. The device of claim 1, wherein the receiving the network event data comprises receiving data generated when the UE device attaches to a network.

5. The device of claim 1, wherein the receiving the network event data comprises receiving data generated when the UE device detaches from a network.

6. The device of claim 1, wherein the providing the edge cloud related network hints comprises providing hints to boot an application container.

7. The device of claim 6, wherein the providing hints to boot the application container comprises providing hints to boot the application container at a specific edge cloud location.

8. The device of claim 1, wherein the providing the edge cloud related network hints comprises providing hints to migrate an application container from a first edge cloud location to a second edge cloud location.

9. The device of claim 1, wherein the providing the edge cloud related network hints comprises providing hints to migrate an application container from a first edge cloud location to a second edge cloud location via a local breakout network function.

10. A non-transitory machine-readable medium, comprising executable instructions that, when executed by a processing system including a processor, facilitate performance of operations, the operations comprising:
receiving a request to authenticate a user equipment (UE) device to a network application programming interface (API) service;
determining that the UE device has network API privileges;
providing an authentication nonce to the UE device;
receiving, via the network API service, a request for edge cloud related network hints from an edge cloud resource manager, wherein the edge cloud related network hints are specific to the UE device, wherein the request for edge cloud related network hints includes the authentication nonce previously provided to the UE device, indicating that the UE device has authorized the edge cloud resource manager to access network API services on behalf of the UE device;
receiving network event data related to the UE device;
creating the edge cloud related network hints from the network event data; and
providing the edge cloud related network hints to the edge cloud resource manager.

11. The non-transitory machine-readable medium of claim 10, wherein the providing the edge cloud related network hints to the edge cloud resource manager comprises providing the edge cloud related network hints to an edge application master node.

12. The non-transitory machine-readable medium of claim 10, wherein the providing the edge cloud related network hints to the edge cloud resource manager comprises providing the edge cloud related network hints to an edge cloud platform.

13. The non-transitory machine-readable medium of claim 10, wherein the receiving the network event data comprises receiving data generated when the UE device attaches to a network.

14. The non-transitory machine-readable medium of claim 10, wherein the receiving the network event data comprises receiving data generated when the UE device detaches from a network.

15. The non-transitory machine-readable medium of claim 10, wherein the providing the edge cloud related network hints comprises providing hints to delete an application container.

16. A method comprising:
receiving, by a processing system including a processor, a request to authenticate a user equipment (UE) device to a network application programming interface (API) service;
determining, by the processing system, that the UE device has network API privileges;
providing, by the processing system, an authentication nonce to the UE device;
receiving, by the processing system, a network API request for edge cloud related network hints from an edge cloud resource manager, wherein the edge cloud related network hints are specific to the UE device, wherein the request for edge cloud related network hints includes the authentication nonce previously provided to the UE device, indicating that the UE device has authorized the edge cloud resource manager to access network API services on behalf of the UE device;
receiving, by the processing system, network event data related to the UE device;
creating, by the processing system, the edge cloud related network hints from the network event data; and
providing, by the processing system, the edge cloud related network hints to the edge cloud resource manager.

17. The method of claim 16, wherein the providing the edge cloud related network hints comprises providing hints to boot an application container at a specific edge cloud location.

18. The method of claim 16, wherein the providing the edge cloud related network hints comprises providing hints to boot an application container.

19. The method of claim 16, wherein the providing the edge cloud related network hints comprises providing hints to migrate an application container from a first edge cloud location to a second edge cloud location.

20. The method of claim 16, wherein the providing the edge cloud related network hints comprises providing hints to migrate an application container from a first edge cloud location to a second edge cloud location via a local breakout network function.

* * * * *